(12) United States Patent
Kippeny et al.

(10) Patent No.: US 8,715,505 B2
(45) Date of Patent: May 6, 2014

(54) METHOD OF REMOVING SALT FROM WATER USING CROWN ETHERS

(71) Applicant: BAE Systems Information and Electronic Systems Integration Inc., Nashua, NH (US)

(72) Inventors: Tadd C. Kippeny, Mount Airy, MD (US); Louise C. Sengupta, Ellicott City, MD (US); Christopher S. Badorrek, Hagerstown, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 7 days.

(21) Appl. No.: 13/743,423

(22) Filed: Jan. 17, 2013

(65) Prior Publication Data

US 2013/0126434 A1    May 23, 2013

Related U.S. Application Data

(62) Division of application No. 12/646,637, filed on Dec. 23, 2009, now Pat. No. 8,377,297.

(51) Int. Cl.
    *C02F 1/28* (2006.01)

(52) U.S. Cl.
    USPC ............ 210/663; 210/668; 210/370; 210/686

(58) Field of Classification Search
    USPC ................. 210/663, 668, 670, 681, 685, 686; 204/520
    See application file for complete search history.

(56) References Cited

U.S. PATENT DOCUMENTS

| | | | |
|---|---|---|---|
| 2,763,607 A * | 9/1956 | Staverman | 210/678 |
| 3,063,924 A * | 11/1962 | Gomella | 210/663 |
| 3,568,833 A | 3/1971 | Ritzen | |
| 3,654,148 A * | 4/1972 | Bradley | 210/636 |
| 4,087,357 A | 5/1978 | Barrett et al. | |
| 5,128,043 A | 7/1992 | Wildermuth | |
| 5,200,041 A | 4/1993 | Simonet et al. | |
| 5,423,965 A | 6/1995 | Kunz | |
| 5,767,060 A | 6/1998 | Hanrahan | |
| 5,951,845 A | 9/1999 | Moulton | |
| 6,207,039 B1 | 3/2001 | Moulton et al. | |
| 6,217,743 B1 | 4/2001 | Moulton et al. | |
| 6,262,258 B1 | 7/2001 | Sibert | |
| 6,309,532 B1 | 10/2001 | Tran et al. | |

(Continued)

OTHER PUBLICATIONS

Hoffman et al.; "Micro and Mesoporosity of Carbon Derived From Ternary and Binary Metal Carbides"; Microporous and Mesoporous Materials vol. 112 Issues 1-3, pp. 526-532, Jul. 1, 2008.

(Continued)

*Primary Examiner* — Matthew O Savage
(74) *Attorney, Agent, or Firm* — Daniel J. Long; Rossi, Kimms & McDowell LLP

(57) ABSTRACT

A desalination apparatus is disclosed which uses a salt sponge unit to remove a majority of salt from water. A parallel plate capacitor can be connected after the salt sponge to remove remaining salt ions. The salt sponge is a nanoporous, high surface area carbon scaffold to which crown ethers are attached. A power supply is connected to the salt sponges for applying a bias voltage to regenerate the salt sponges. A chlorine treatment unit can be connected after the parallel plate capacitor. A method of purifying sea water using the apparatus also is disclosed.

3 Claims, 7 Drawing Sheets

(56) References Cited

U.S. PATENT DOCUMENTS

| | | |
|---|---|---|
| 7,481,929 B2 | 1/2009 | Wilkins et al. |
| 7,541,312 B2 | 6/2009 | Dietz et al. |
| 7,566,385 B2 | 7/2009 | Mazur et al. |
| 7,625,839 B2 | 12/2009 | Hirahara et al. |
| 7,658,828 B2 | 2/2010 | Freydina et al. |
| 7,670,510 B2 | 3/2010 | Wong et al. |
| 7,846,340 B2 | 12/2010 | Freydina et al. |
| 2003/0149122 A1 | 8/2003 | Bureau et al. |
| 2004/0164025 A1 | 8/2004 | Lewis et al. |
| 2007/0170060 A1 | 7/2007 | Bourcier et al. |
| 2009/0001009 A1 | 1/2009 | Linder et al. |
| 2010/0102009 A1 | 4/2010 | Silva |
| 2011/0253635 A1 | 10/2011 | Godlien |

OTHER PUBLICATIONS

Franck Le Derf et al.; "Electroregulated Metal-Binding with a Crown Ether Tetrathiafulvalene Derivative: Toward Electrochemically Addressed Metal Cation Sponges"; Inorganic Chemistry, 1999, vol. 38, No. 26; pp. 6096-6100.

* cited by examiner

METHOD OF REMOVING SALT FROM WATER USING CROWN ETHERS

RELATED APPLICATIONS

This is a divisional application of Ser. No. 12/646,637 filed Dec. 23, 2009. This application is herein incorporated by reference in its entirety for all purposes.

BACKGROUND OF THE INVENTION

A. Field of the Invention

The invention relates generally to an apparatus and method for purifying water, and more particularly an apparatus and method for water desalination (salt removal).

B. Description of the Related Art

Current reverse osmosis (RO) systems for large scale water purification are very efficient for meeting water quality purity on brackish salinity levels, ~7000 ppm. However, these systems become more inefficient as the salt content of the water increases and are very energy intensive at deep seawater salt concentrations, e.g., 35,000 ppm. Distillation is characterized by high energy demand, while RO systems require both high pressure produced by required pumps, and extensive maintenance due to fouling and damage of the membrane. Thus, both distillation and RO are unsuitable for use in places in which energy is limited, such as third world countries, and for use in rapid military deployment operations.

The present invention is directed to overcoming or at least reducing the effects of one or more of the problems set forth above by leveraging a spontaneous process to directly accomplish salt removal.

SUMMARY OF THE INVENTION

A desalination apparatus according to the invention comprises a salt sponge unit for removing a majority of salt from water. The salt sponge comprises a nanoporous, high surface area carbon scaffold to which crown ether type moieties are attached. The salt sponge in this embodiment is single use. In a preferred embodiment the salt sponge unit comprises two separate salt sponges and can comprise a valve for directing water to one or the other of the two salt sponges allowing for continuous processing. The apparatus also can additionally comprise a power supply connected to the salt sponges for applying a bias voltage to the salt sponges in order to regenerate the salt sponge material allowing for continuous reuse. The apparatus additionally may comprise a parallel plate capacitor connected after the salt sponge to remove remaining salt ions, and a chlorine treatment unit. Addition of a chlorine treatment unit, and a parallel plate capacitor or reverse osmosis system, provides a complete water purification system.

The invention provides a method of removing salt from water, comprising flowing water from which salt is to be removed through a salt sponge to remove a majority of salt from the water. After the water exits the salt sponge it can be sent through a parallel plate capacitor to remove remaining salt ions. The method additionally can comprise applying a bias voltage to the salt sponge to regenerate the salt sponge after it has removed salt from the water.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
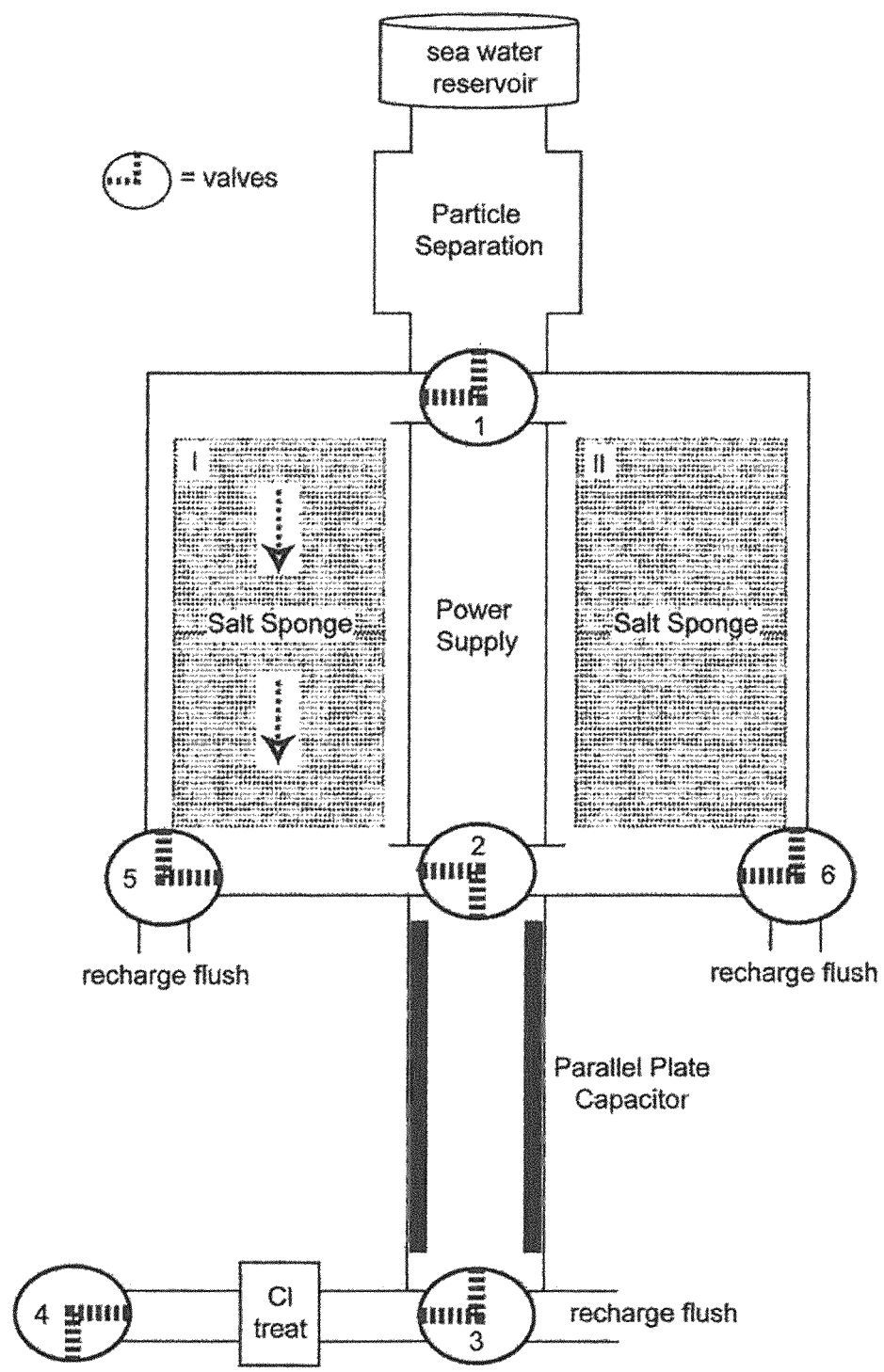
FIG. 1 shows the components of the desalination unit.

The invention provides an alternative to existing systems for purifying water, particularly for water desalination (salt removal). The system according to the invention is a regenerative hybrid desalination system which includes two stages: (i) a front end "salt sponge" to remove much of the salt from seawater and (ii) a back end parallel plate capacitor to remove any remaining dissolved salts. This system design is lightweight and portable, requires only minimal power and pressure due to the hybrid design, and yet it provides a high rate of water purification of up to 75 gph. Addition of the salt sponge to a reverse osmosis system or capacitive deionization system provides a great improvement in efficiency of either.

The base for the salt sponge in this description can be any form of graphitic carbon although higher surface area materials provide for higher loading of the functionalizing agent (crown type ether). Embodiments may include high surface area carbon materials such as nanoporous carbide derived carbons, carbon aerogels, or carbon foams to provide very high surface area carbon scaffold(s). The nanoporous scaffold can be made into various shapes and sizes at small cost. For example, in a preferred embodiment, the ultra high surface area carbide derived carbon scaffold is made by treating a metal carbide with chlorine gas to remove the metal leaving a nanoporous carbon of exceptionally high surface area and controlled pore size as described in Hoffman at al. "Micro and Mesoporosity of Carbon Derived From Ternary and Binary Metal Carbides" Microporous and Mesoporous Materials 112 (1-3), 526-532 (2008).

According to the invention, crown ether type molecules are attached to the very high surface area carbon scaffold to produce a salt sponge. Crown ethers are heterocyclic chemical compounds that consist of a ring containing several ether groups. The most common crown ethers are oligomers of ethylene oxide, the repeating unit being ethyleneoxy, i.e., —$CH_2CH_2O$—. Important members of this series are the tetramer (n=4), the pentamer (n=5), and the hexamer (n=6). The term "crown" refers to the resemblance between the structure of a crown ether bound to a cation, and a crown sitting on a head. The first number in a crown ether's name refers to the number of atoms in the cycle, and the second number refers to the number of those atoms that are oxygen. Although the term crown ether has specific meaning it is applied to a much broader collection of molecules than just the oligomers of ethylene oxide such as the nitrogen containing ligands known as cryptands as well as mixed oxygen-nitrogen compounds, e.g., aza-crowns.

Crown ethers strongly bind certain cations, forming complexes, and are well known for their selectivity to particular ions based on ring size. The oxygen atoms coordinate with a cation located at the center of the ring, whereas the exterior of the ring is hydrophobic. The main characteristic of crown ether is the complexation of the ether oxygens (or nitrogens) with various ionic species. Once an charged ionic species is bound, the crown compound is then termed "host-guest" chemistry. The crown ether acts as the "host" taking ionic species as its "guest." Crown compounds locks guest atoms in a solution and wrap around it. The size of the polyether influences the affinity of the crown ether for various cations. For example, 18-crown-6 has high affinity for potassium cation, 15-crown-5 for sodium cation, and 12-crown-4 for lithium cation.

In order to purify sea water, a 15-crown-5, is used since sodium chloride is the dominant ion dissolved in salt water The common names of crown ethers have a prefix to designate the total number of atoms in the cycle and a suffix to designate the number of oxygen atoms in the cycle. For example, 15-crown-5 is composed of 15 atoms in the cycle, 5 of which are oxygen (O) and 10 of which are carbon (C).

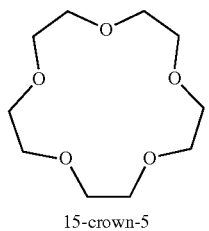 [SMILES: C1COCCOCCOCCOCCO1]

15-crown-5

15-Crown-5 (IUPAC 1,4,7,10,13-pentaoxacyclopentadecane) is a crown ether with the formula $C_{10}H_{20}O_5$. It is a cyclic pentamer of ethylene oxide that has been shown to complex with various cations, including sodium ($Na^+$), and potassium ($K^+$), as well as selective binding to lead ($Pb^{2+}$).

In addition, one of the oxygens can be replaced with a nitrogen. This class is the aza-crown and the most effective binding for sodium chloride is aza-15-crown-5 (IUPAC 1,4,7,10-Tetraoxa-13-azacyclopentadecane).

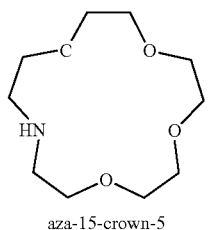 [SMILES: C1CCNCCOCCOCCOCC1]

aza-15-crown-5

Attachment of the crown ethers to the graphitic substrate (powder, solid, or foam) comprises two main steps. The first step is attachment of a linker to the graphite surface and the second step is connection of the crown ether, preferably an aza-15-crown 5 ether, to the linker.

In the first step, the graphitic substrate samples are cleaned in a suitable solvent, such as acetone, via a continuous washing method such as Soxhlet extraction for 8 to 12 hours, followed by complete evaporation of the solvent. Coupling of 4-fluoro-aniline to the substrate is performed via a diazonium salt intermediate in a solution of tetrahydrofuran (THF). Isopentyl nitrite (IPN) is added dropwise to create a diazo complex which couples to the graphitic surface and is allowed to react for 4-60 hours. At the end of the process, samples are cleaned in suitable solvent, e.g., THF, using a Soxhlet extractor, for 8 to 12 hours, over 1-5 washings and then all solvent is allowed to evaporate.

In the second step, the crown ether, preferably aza-15-crown 5, is dissolved in an aprotic solvent, such as hexamethyiphosphoramide (HMPA), saturated with cesium carbonate. Linked graphitic substrate, as synthesized in the first step, is then added. The reaction mixture is then heated to between 30 and 100° C., while agitating for 6-48 hours. At the end of the process, samples are cleaned in a suitable solvent, e.g., THF, using a Soxhlet extractor, for 8 to 12 hours, over 1-5 washings and then all solvent is allowed to evaporate leaving the completed modified graphitic salt sponge.

The seawater can be fed by gravity or low pressure (10-15 psi) into the tanks containing the salt sponges. In the tanks, diffusive kinetics (equilibrium rather than pressure) governs the interaction between the crown ethers and the salt ions, resulting in a large uptake of the salt in the seawater. The salt sponge can rapidly extract salt ions from seawater by rapid diffusion kinetics rather than high pressure. The salt sponge is capable of removing large amounts of salt from seawater, and the end result is brackish water with a much lower concentration of salt.

The only power required for the salt sponge is a bias voltage of approximately 1.5 volt. The bias voltage is applied to drive the salt ions off the crown ethers during a regeneration step. A low bias voltage also is used in the nanoporous, high surface area nanoporous carbon-based parallel plate capacitors, which require less than 300 W/hr. Because both the salt sponge and the parallel plate capacitor are electrolytically regenerated, rather than being regenerated by chemical or physical means, both maintenance time and rate of purification are significantly reduced.

In the back end portion of the system, any ions left over after the water passes through the salt sponge are removed using capacitive deionization. Capacitive deionization is a relatively new technology developed for the purification of ocean and brackish water, and is based on an electrostatic process operating at low voltages and pressures. Water to be purified is pumped through a nanoporous, carbon-based parallel plate capacitor. A constant voltage is applied and soluble salts are collected on the surface of porous carbon electrodes, thus purifying the water for human consumption or industrial processes.

More particularly, the water flows between pairs of high surface area carbon electrodes that are held at a potential difference of, for example, 1.2 V. The ions and other charged particles (such as microorganisms) are attracted to and held on the electrode of opposite charge. The negative electrode attracts positively charged ions (cations) such as calcium (Ca), magnesium (Mg) and sodium (Na), while the positively charged electrode attracts negative ions (anions) such as chloride (Cl) and nitrate ($NO_3$). The end result is potable water. This concentrates the ions at the electrodes, while reducing the concentration of the ions in the water. The cleaned water then passes out of the unit.

When the electrodes' capacity is reached, the water flow is stopped and the polarity of the electrodes is reversed. This causes the ions to move away from the electrodes, where they had previously accumulated. The concentrated brine solution is then purged from the unit. U.S. Pat. No. 7,541,312 and U.S. Pat. No. 7,625,839 disclose activated carbon for use in electric double layer capacitors for capacitive deionization.

In an alternative embodiment, reverse osmosis is used in the back end portion of the system to remove any ions left over after the water passes through the salt sponge.

A desalination unit according to the invention is shown in FIG. 1. The unit includes sea water reservoir 10 for receiving and holding sea water. From sea water reservoir 10, sea water flows by gravity or a low pressure feed to particle separation unit 11. Valve 1 controls flow from particle separation unit 11 to salt sponge unit 12. Two salt sponges, 12-I and 12-II, are shown in FIG. 1, although salt sponge unit 12 could include more than two salt sponges. In a first position, valve 1 directs the flow of sea water to salt sponge 12-I and in a second position, valve 1 directs the flow of sea water to salt sponge 12-II. In a third position, valve 1 prevents the flow of sea water to either of the salt sponges.

Valve 2 controls the flow of sea water out of the salt sponges and into parallel plate capacitor 14. In a first position, valve 2 directs the flow of sea water from salt sponge 12-I to parallel plate capacitor 14 and in a second position, valve 2 directs the flow of sea water from salt sponge 12-II to parallel plate capacitor 14. In a third position, valve 2 prevents the flow of sea water from either of the salt sponges.

Valve 3 controls the flow of sea water as it exits parallel plate capacitor 14. In a first position, valve 3 allows sea water to exit parallel plate capacitor 14 and pass to optional chlorine treatment unit 15. In a second position, valve 3 prevents sea water from exiting parallel plate capacitor 14.

Valve 4 controls the flow of sea water as it exits chlorine treatment unit 15. In a first position, valve 4 allows sea water to exit chlorine treatment unit 15. In a second position, valve 4 prevents sea water from exiting chlorine treatment unit 15. Water flowing from valve 4 is potable, and can be dispensed into a storage container (not shown) or connected to a water distribution system (not shown).

Each salt sponge in the desalination unit also is connected to a recharge flush valve. Salt sponge 12-I is connected to valve 5 and salt sponge 12-II is connected to valve 6. In a first position, valve 5 or 6 allows a recharge flush to remove salt ions from the salt sponge. Salt ions are released from the salt sponge by applying a bias voltage to the salt sponge, using power supply 13. In a second position, valve 5 or 6 is closed during the filling and purification cycles of the salt sponge.

Figure 2:
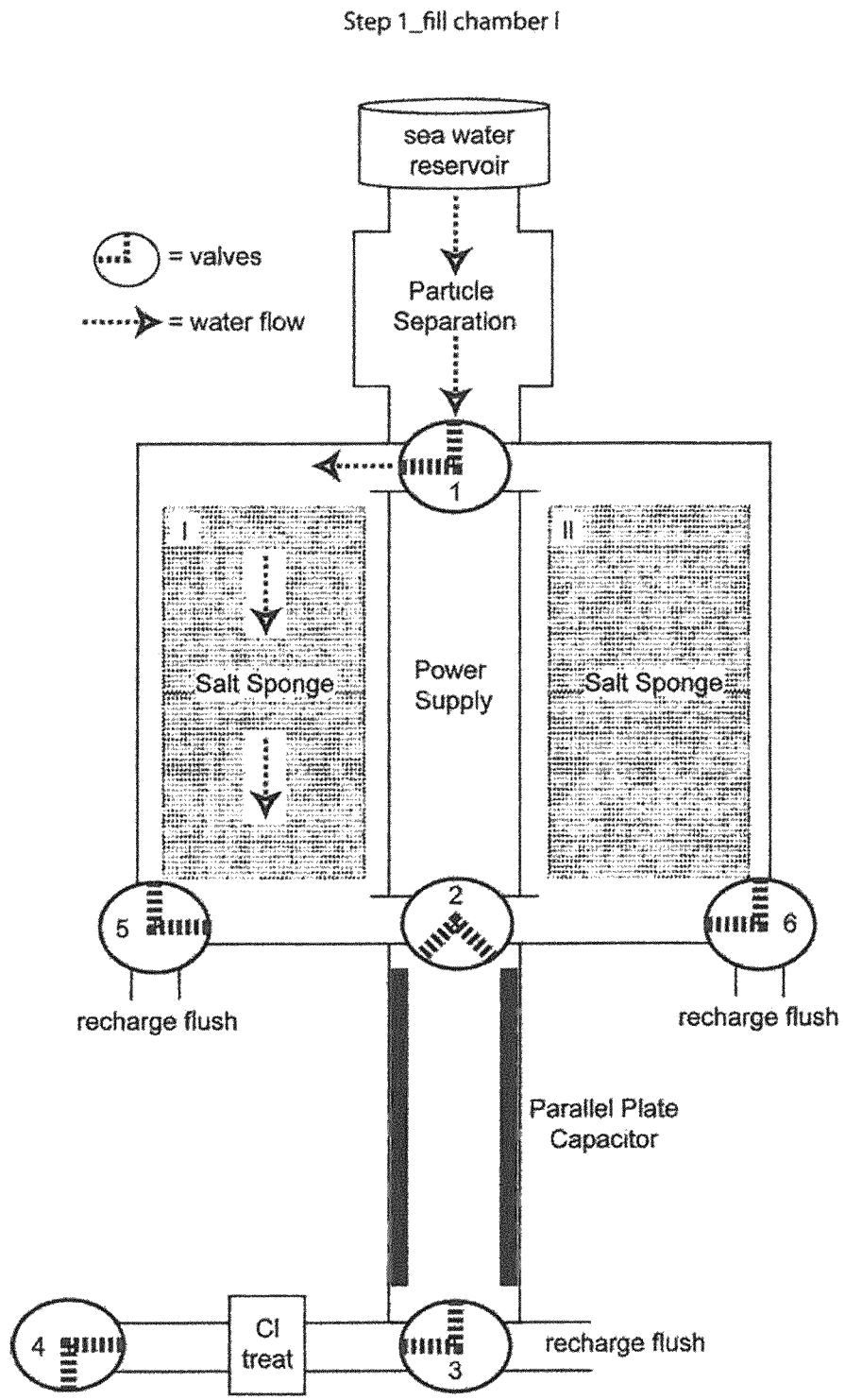
FIG. 2 is a schematic showing a first step in the desalination process.

Steps in the desalination process are shown in FIGS. 2 through 6. In a first step, sea water in sea water reservoir 11 flows to particle separation unit 11 where it is micro- or nano-filtered to remove particles greater than 1 to 5 microns and then through opened valve 1 to one of the two salt sponges in salt sponge unit 12. In FIG. 2, it is shown being directed to salt sponge 12-I. When the sea water flows through the salt sponge a majority of the salt binds and is removed from the sea water.

Figure 3:
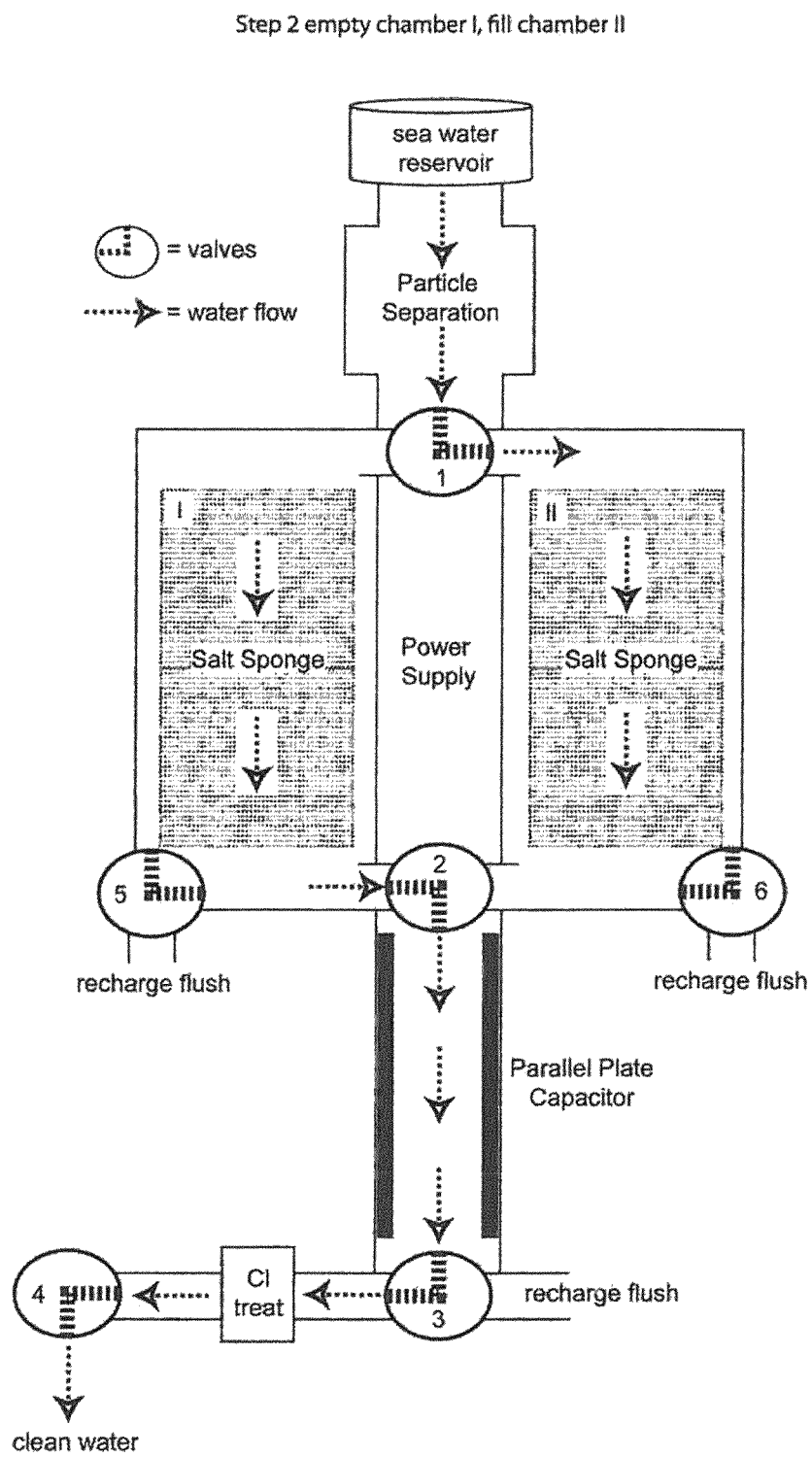
FIG. 3 is a schematic showing a second step in the desalination process.
Figure 4:
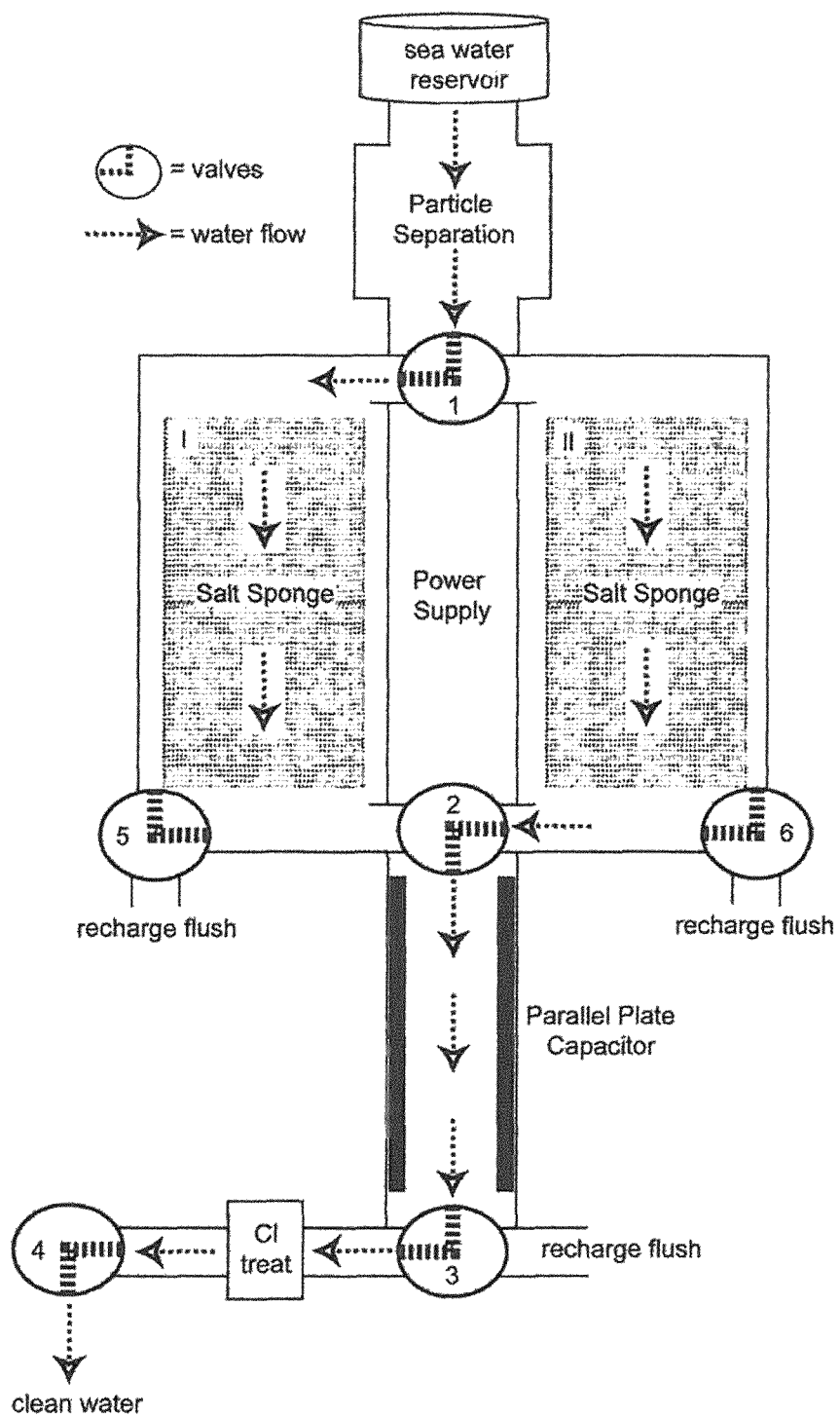
FIG. 4 is a schematic showing a third step in the desalination process.

In a second step, shown in FIG. 3 the now brackish water, typically containing between 5,000 and 10,000 mg/L, exits salt sponge 12-I through opened valve 2 to parallel plate capacitor 14, and valve 2 is closed. In parallel plate capacitor 14, the brackish water is further purified. After valve 2 is closed, valve 1 is opened to direct sea water from sea water reservoir 10 through particle separation unit 14 and into salt sponge 12-II in salt sponge unit 12, where a majority of the salt is removed by binding to the salt sponge, as just described.

Figure 5:
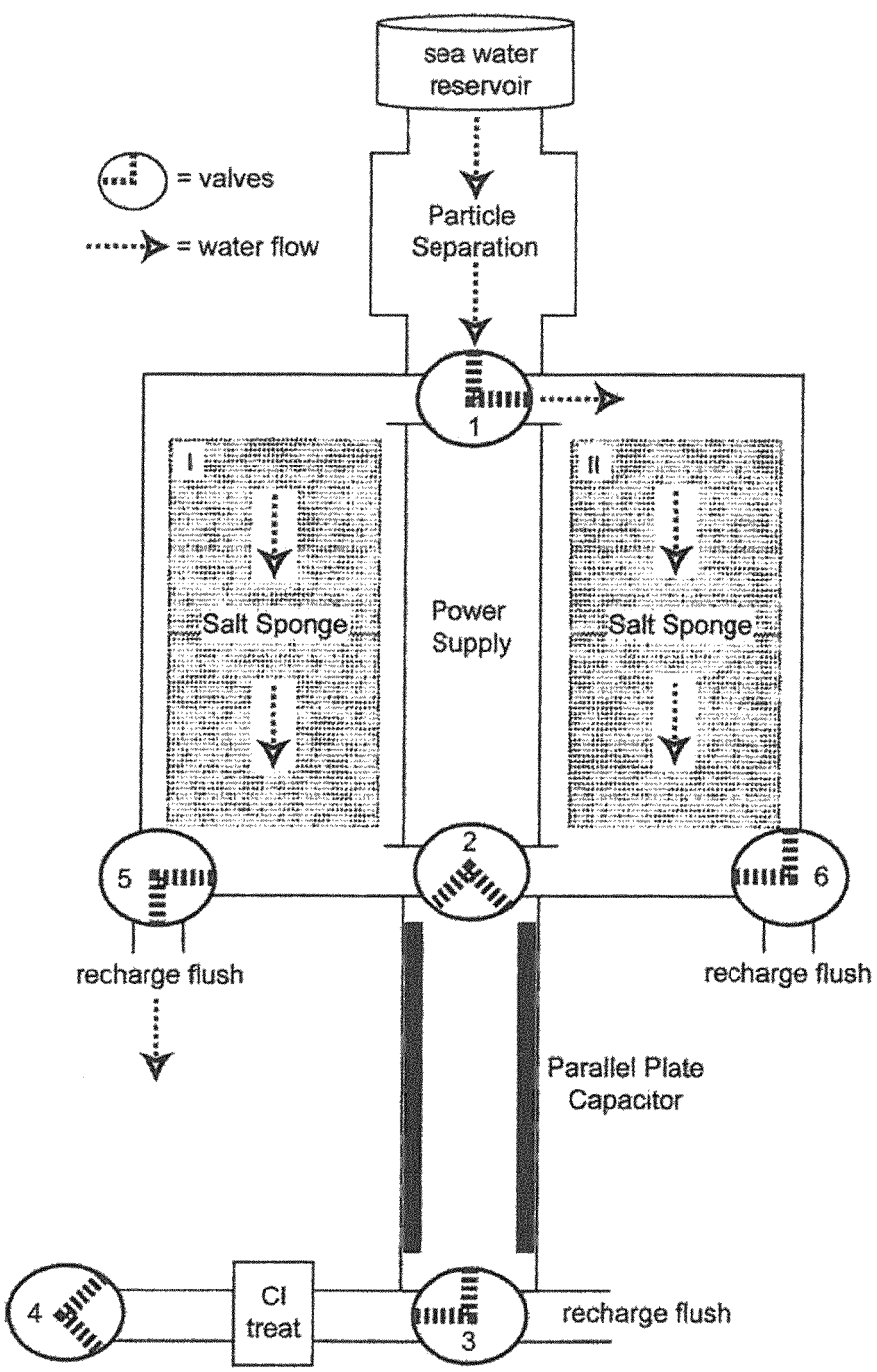
FIG. 5 is a schematic showing a fourth step in the desalination process.
Figure 6:
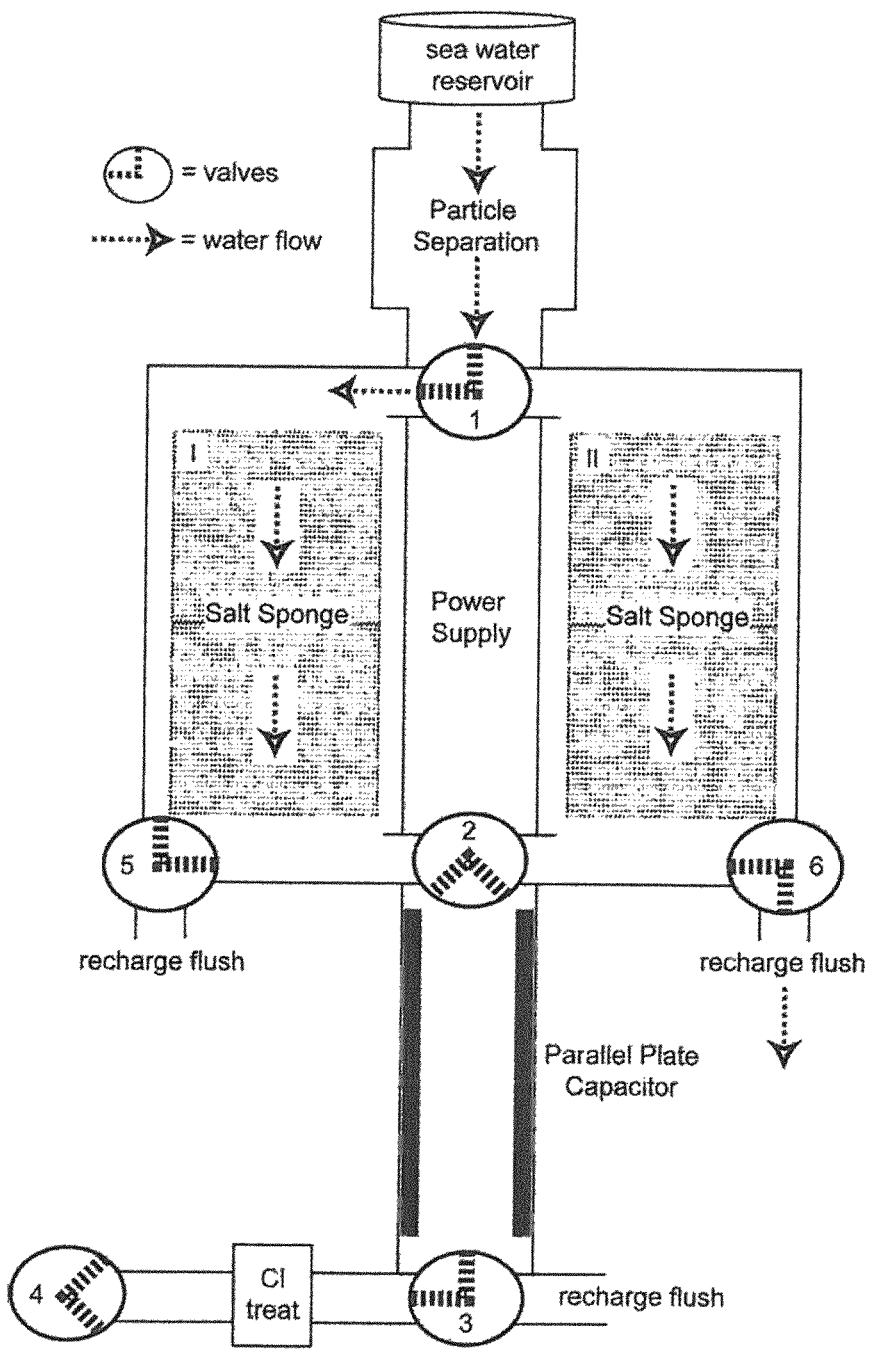
FIG. 6 is a schematic showing a fifth step in the desalination process.

Thus, the desalination unit simultaneously treats one batch of sea water in a salt sponge, while another batch of sea water which has already exited the other salt sponge is treated in parallel plate capacitor 14. At the same time, salt sponge 12-I can be regenerated by applying a bias voltage of about 1.5 volts using power supply 13. Valve 5 controls the recharge flush of salt sponge 12-I. This is shown in FIG. 5. Valve 6 controls the recharge flush of salt sponge 12-II. This is shown in FIG. 6.

The driving force from the bias is sufficient to force the salt ions from the crown ether into even the same water being sent to the salt sponge for desalination. Alternatively, a portion of the de-salted water is mixed with fresh salt water to flush and regenerate the sponge. Then that water gets dumped and new salt water is added to be de-salted and the cycle is repeated. In another embodiment, regeneration is accomplished by adjusting the fermi level of the crown ether itself with the bias, thereby lessening the negative charge of the oxygens and thus the binding strength of the crown ether to the sodium ion.

When valve 3 is open, water from parallel plate capacitor 14 flows to chlorine treatment unit 15. Valve 3 is then closed, and valve 2 is moved to its second position where it allows treated water from salt sponge 12-II to flow into parallel plate capacitor 14. Once salt sponge 12-I has been regenerated, the cycle begins again.

Figure 7:
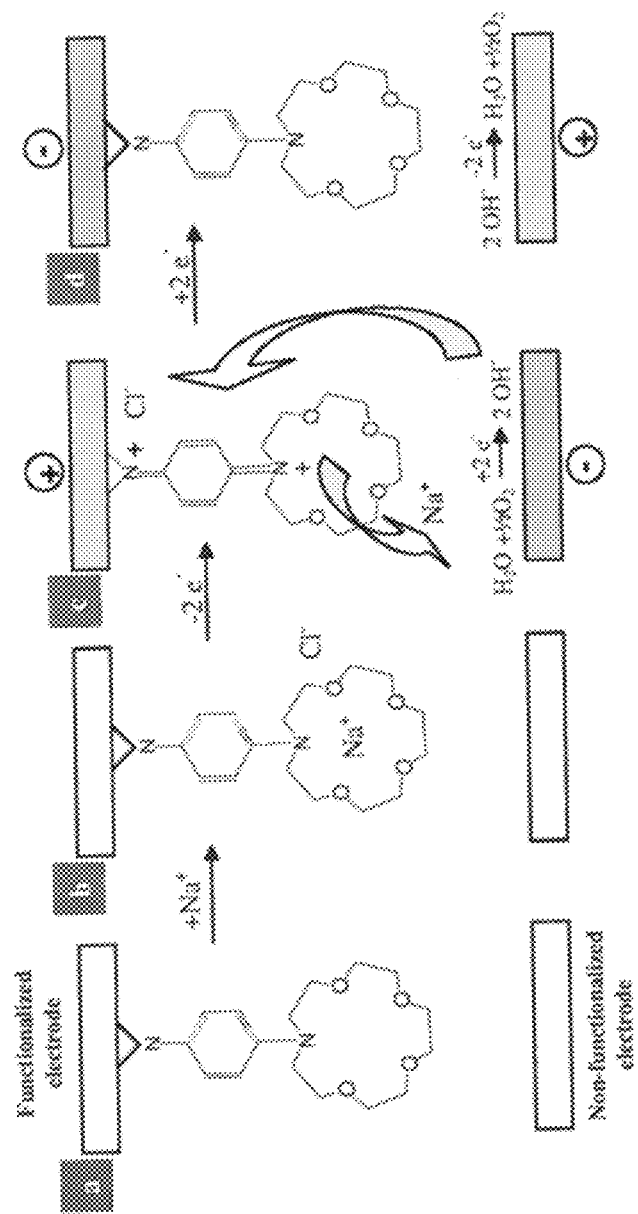
FIG. 7 is a schematic showing the operation of the salt sponge.

FIG. 7 shows the operation of the salt sponge. Electrochemical mechanisms involved in the salt sponge process are (a) Step 1—Salt sponge component is exposed to saline solution, (b) Step 2—uncharged aza-15-crown 5 ether absorbs one $Na^+$ ion from solution, (c) Step 3—removal of $Na^+$ from the cavity of the crown ether by applying voltage from an external power source, (d) Step 4—2-electron reduction enables for the regeneration of the crown ether to its initial form, as in Step 1.

Alkali ions are captured by the salt sponge and later released by electrochemical oxidation as shown schematically in FIG. 7. FIG. 7 also shows restoring the initial form of the aza crown ether, and shows half reactions that complete each electrochemical step.

Crown ethers are known to sequestrate alkali ions from solution. In Step 1, salt sponge component is exposed to salt solution (FIG. 7a). In Step 2, uncharged aza-15-crown 5 ether absorbs one $Na^+$ ion from solution, along with a "spectator" $Cl^-$ ion, which locally balances the charge (FIG. 7b). This process removes significant amounts of NaCl from seawater, lowering its salinity from 33,000 ppm to 5,000 ppm. In FIGS. 7a and 7b the electrodes are not connected to external power sources, and the ion sequestration is driven by the chemical affinity of the crown ether toward $Na^+$ ions. In order to re-use the salt sponge, the sodium ions need to be removed from the cavity of the crown ether. In order to re-use the crown ether-based salt sponge, it must be regenerated, i.e., the sequestrated sodium ions should be removed from the cavity of the crown ether. Release of $Na^+$ ions is accomplished by applying a DC voltage onto the on sponge, such that the modified electrode will be of positive polarity, i.e., the anode in the driven cell, while the non-modified electrode is of negative polarity, driving the cathodic reduction of molecular oxygen to hydroxide ions (FIG. 7c).

As evidenced by differential pulse voltammetry, a two-step oxidation process is needed for expelling the $Na^+$ ion into solution. In the first step of the process, the aromatic ring is oxidized, forming an extended conjugated system. Then, a second oxidation leaves a positive charge on the nitrogen atom, which is part of the aza-crown ether ring. This positive charge generated in the proximity of the entrapped cation expels the $Na^+$ ion from the cavity by electrostatic repulsion. While 2 electrons are removed from the crown, in the anode process, in the other half reaction 2 electrons are being supplied to an electron sink, most probably the molecular oxygen, dissolved in water. This cathode process yields 2 hydroxide ions, which balance the positive charges of the crown ether.

As the above oxidation steps are reversible, subsequent to the removal of sodium ions, the crown ether can be reduced in a 2-electron process to its initial form, so that it can absorb new $Na^+$ ions from solution. As shown in in Step 4 of FIG. 7, the ion sponge is returned to its initial form (compare FIG. 7d to FIG. 7a). Polarity is now reversed, as compared to Step 3 (FIG. 7c), the modified electrode becoming the cathode (of negative polarity in a driven cell), while the non-modified electrode is the anode (of positive polarity). As shown in FIG. 7d, in Step 4 the charge compensating reaction is the re-oxidation of hydroxide ions to molecular oxygen and water.

As seen above, in addition to the functionalized electrode a second electrode (the counter electrode) completes the system, to allow for the rejuvenation of the ion sponge. The counter electrode can be a non-functionalized graphite plate of graphite aerofoam, or more preferably a non-functionalized CDC. This electrode capacitively absorbs and desorbs $Cl^-$ ions. Even though it has a lower capacitance than the functionalized material, the ability to use a relatively thinner functionalized positive electrode allows for significant mass and volume reduction.

Example

Aza-15-crown-5 ether was attached to three different carbon substrates:

(i) Plain graphite plates, which allowed for straightforward and fast testing;

(ii) Graphite fibers mesh (530 Plain Weave Carbon Fiber Fabric, Fiberglast Co.), which offered the advantage of greater surface area than graphite plates; prior to chemical modification, the material was baked in air, for removing the epoxy sizing; and (iii) Carbon aerofoam with very large surface area with very large surface area without coating, ridged and open cell for rapid flow through; this material enables for confining to its surface a large number of crown ether groups that retain the alkali ions from seawater.

Modification of the graphite substrates included two main steps:

(i) tethering to the surface of a linker with an outermost functional group, and (ii) connecting the aza-15-crown 5 ether to the linker.

First, graphite substrate samples (foam or plate) were tied with 6-8" twisted strands of Teflon tape. This allowed the material to be suspended, and enabled magnetic stirring of the coupling reagents, without hitting the graphite material. Prior to tethering, the graphite substrates were washed for a minimum of 8 hours with acetone, by refluxing them in a Soxhlet extractor. Then, the samples were air dried, and stored in 11 dram glass vials, equipped with Teflon lined septa.

Coupling of 4-fluoro-aniline to the carbon substrate was performed via a diazonium salt intermediate. This process required an initial solution of 10 mL of 4-fluoro-aniline in 15 mL of tetrahydrofuran (THF). Each graphite sample was placed in a glass container with a magnetic stir bar at its bottom. Care was taken to position the graphite substrates by means of the Teflon strand just above the stir bar. In order to allow for eventual nitrogen evolution, gas released from the reaction chemistry, upon the decomposition of the diazonium salt, an empty gas balloon was inserted into the septa. Initially, 10 of isopentyl nitrite (IPN) was added.

It was found that the use of three 5 mL aliquots of IPN, added over a 15 hour time period (every 5 hours), was more efficient than supplying the entire amount of reagent from the very beginning. As revealed by the recorded larger electrochemical signal, sequential addition of IPN led to a more advanced surface modification than one-time addition. This electrochemical signal was proportional to the surface coverage of tether, being a result of a more profound surface modification.

At the end of the process, samples were washed with acetone in a Soxhlet extractor, for 8-12 hours, and then all materials were air dried, and stored in Teflon lined 11 dram glass vials equipped with Teflon lined septa until further modification.

Results of the chemical modification were assessed via electroanalytical methods, including cyclic voltammetry (henceforth abbreviated as CV) and differential pulse voltammetry (DPV). Both techniques revealed the presence of the linker on the surface, and allowed the surface coverage to be estimated.

The presence of the tether on the substrate was evidenced by cyclic voltammetry. The surface coverage of the linker was calculated as corresponding to approximately $\frac{1}{100}$ of a monolayer. There was better efficiency for the 3-step addition of smaller aliquots of isopentyl nitrite, as compared to the 2-step addition procedure, and the former produced approximately 72% of a monolayer.

DPV was used to demonstrate the attachment of the aza crown ether to the linker. The oxidation pattern becomes simpler when the crown ether is attached as compared to the free linker. Peaks present in the scan with linker only disappear after the crown is attached.

Thus, a desalination apparatus and process has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

The contents of all documents mentioned herein are incorporated by reference in their entirety.

What is claimed is:

1. A method of removing salt from water, comprising flowing water from which salt is to be removed through a salt sponge formed by a carbon scaffold to which crown ethers are attached to remove a majority of salt from the water and then applying a bias voltage to regenerate the salt sponge after it has removed salt from the water.

2. The method according to claim 1, additionally comprising flowing the water through a parallel plate capacitor to remove salt ions after it exits the salt sponge.

3. The method according to claim 1, additionally comprising chlorinating the water after the salt has been removed.

* * * * *